United States Patent [19] [11] 3,985,009
Lipschutz [45] Oct. 12, 1976

[54] COMPACT ANTI-THEFT DEVICE FOR VEHICLES
[75] Inventor: Paul Lipschutz, Croissy-Sur-Seine, France
[73] Assignee: Societe d'Exploitation des Brevets Neiman S.A., Courbevoie, France
[22] Filed: Mar. 3, 1975
[21] Appl. No.: 554,802

[30] Foreign Application Priority Data
Mar. 18, 1974 France .............. 74.09087

[52] U.S. Cl. .................. 70/252; 70/249; 200/44
[51] Int. Cl.² .............. B60R 25/02; B60R 25/04
[58] Field of Search ........... 70/239, 243, 248, 250, 70/251, 252, 254, 255, 257; 180/114, 44; 200/44, 61.54, 153 P

[56] References Cited
UNITED STATES PATENTS
1,201,384 10/1916 Swyers ................. 200/43
1,362,685 12/1920 Farah .................. 70/251
3,566,635 3/1971 Wolter ................. 70/252
3,590,612 7/1971 Henning ............... 70/239
3,622,718 11/1971 Lipschutz ............. 200/44
3,703,092 11/1972 Elliott ................ 70/248
3,791,182 2/1974 Oxley ................. 70/252

FOREIGN PATENTS OR APPLICATIONS
144,173 3/1931 Switzerland ........... 70/243

Primary Examiner—R. Wolfe
Assistant Examiner—A. Craig, Jr.
Attorney, Agent, or Firm—Nolte and Nolte

[57] ABSTRACT

A compact anti-theft device for a motor vehicle comprises a cylindrical lock, a rotary electrical switch and a bolt, a driving connection is made between the lock and the switch which includes gears and the axes about which the switch and lock rotate are parallel and offset or are disposed at angles to each other.

8 Claims, 5 Drawing Figures

COMPACT ANTI-THEFT DEVICE FOR VEHICLES

The adaptation of an anti-theft device to certain types of vehicles is subject to restrictive requirements concerning possibility of access and space available for the device, which requirements are rendered very stringent owing to the exiguity of the compartments or cabs, the increase in the number of instruments, and the increased accent put on the provision of a larger amount of space for the passengers or the pay load within the framework of overall sizes laid down by regulations.

Moreover, there are other requirements such as those for decreasing the gravity of accidents which may occur by contact of the limbs of the driver with the anti-theft device or its key.

In a conventional device, ensuring the mechanical locking of the steering or of an element essential to the operation of the vehicle, the following elements are provided:

a safety lock with its coded key,
a mechanism which controls, upon movement of the key, the movement of the locking bolt,
said locking bolt is engaged in a keeper integral with the moving part to be locked,
an electric switch ensuring the necessary connections between the various parts of the electrical system on the vehicle: battery, ignition coil, starter, or decompresser, injection pump, auxiliary apparatuses, etc.

These elements, which are fitted one inside the other, constitute a system generally arranged along a common axis and correspond to a great length which is contrary to the aforementioned requirements.

The present invention in its various forms has for object to reduce this overall length while ensuring a perfect and even more rational interconnection between the various parts of the device.

An object of the invention is to axially offset the aforementioned elements without adversely affecting the reliability by use of elements which are positively connected to the essential parts.

For example, in order to reduce the overall length, the inventor proposes to offset either the axis of the switch or the axis of the bolt control with respect to the axis of the lock.

Aesthetic considerations, or the desired position of the key with respect to the steering column, may also require that these two elements be placed at a distance from each other to which problem the inventor proposes a solution in the last embodiment disclosed in the ensuing description.

Various embodiments of the invention will now be described by way of example, to which the invention is not intended to be limited, with reference to the accompanying drawings in which.

Figure 1:
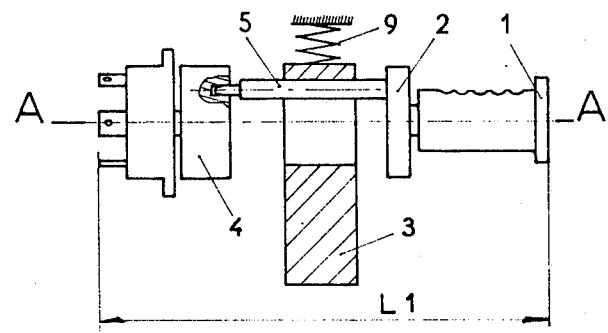
FIG. 1 is a kinematic diagram representing a conventional device having a transverse bolt and including the aforementioned elements.

FIG. 1 shows a conventional anti-theft device including a lock barrel 1 which is integral with a disc 2 provided with an eccentric finger member 5 which controls the transverse bolt 3 which is biased by a spring 9. The finger member 5 is extended so as to act on the rotor of the switch 4 through the bolt 3. The assembly of the anti-theft device is arranged on a general axis A—A on which it occupies a length L1.

Figure 2:
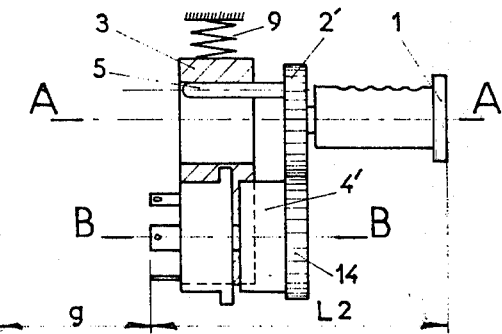
FIG. 2 is a diagram of an embodiment according to the invention of a compact device having a transverse bolt of the same type as the device shown in FIG. 1, the axis of the lock and bolt mechanism being offset with respect to the axis of the switch.

In the embodiment shown in FIG. 2, the switch 4' is no longer in the extension of the lock 1 but has its axis B—B offset from the axis A—A and parallel to the latter. It is controlled by a set of gear pinions 2' and 14, the pinion 2' being provided with the finger member 5 controlling the bolt 3 and the pinion 14 being keyed on the rotor of the switch and driving this rotor. It can be seen that the length L2 of the assembly is less than the length L1 and results in an appreciable saving $g$ with respect to the conventional arrangement.

Figure 3:
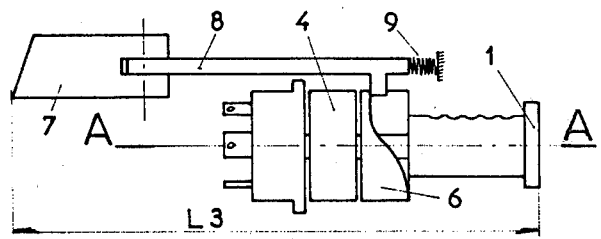
FIG. 3 is a diagram of a conventional device having a bolt parallel to the axis of the lock.

FIG. 3 shows a conventional anti-theft device with the bolt placed axially with respect to the lock 1. The bolt 7/8 is withdrawn by a cam 6 integral with the rotor 1. This bolt 7/8 is biased by a spring 9. The switch 4 is driven by the rotor of the lock 1. The assembly has a length L3.

Figure 4:
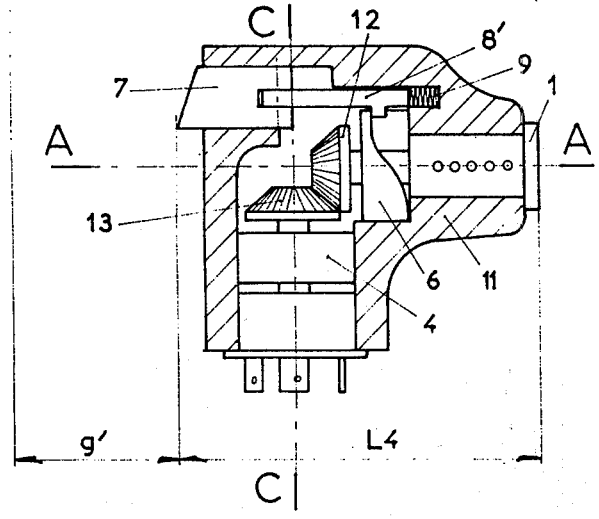
FIG. 4 shows an embodiment according to the invention of a device having a bolt parallel to the axis of the lock, the axis of the switch being perpendicular to the axis of the lock.

In the embodiment of the invention shown in FIG. 4, a change in direction of motion, provided by a pair of bevel gears 12 and 13, permits placing the switch 4 perpendicular to the axis A—A of the lock 1. Thus the initial overall size L3 becomes L4 and results in a gain $g'$ with respect to the initial overall length. It is clear that such a change in direction can be obtained by any other means (eccentric cam, worm etc.).

In this way it is possible to move the assembly of the antitheft device nearer to the steering column, since it is no longer necessary to provide space for the switch 4. This is of particular importance from the point of view of safety in the event of shock.

Figure 5:
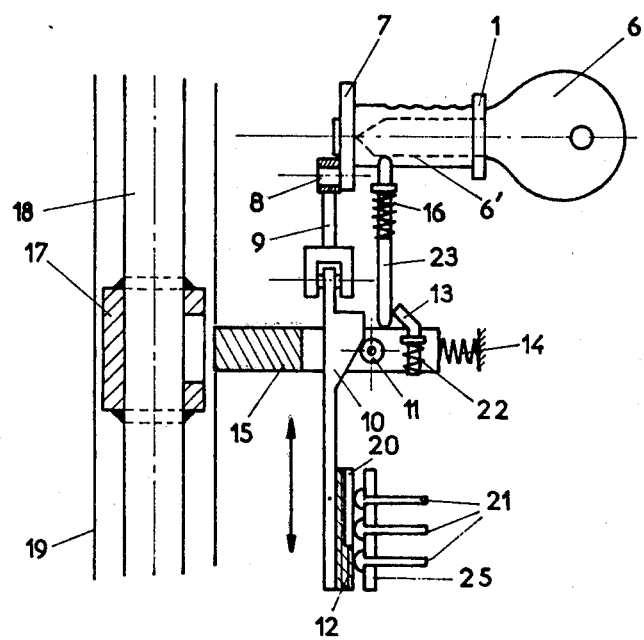
FIG. 5 is a schematic part-elevational, part-sectional view of an alternative form of this invention.

Aesthetic considerations, or the desired position of the key with respect to the steering column, may require that these two elements be placed at a distance from each other while imposing a small overall size in a direction perpendicular to the steering column. This requirement is satisfied by the device shown in FIG. 5. The key 6 controlling the barrel 1 drives the plate 7 provided with a crank-pin 8. This eccentric arrangement acts through a link 9 on the linear ramp 10. The ramp cooperates with a roller 11 whose spindle is integral with the bolt 15.

The ramp 10 withdraws the bolt by compressing the spring 14. A lug 13, biased by a spring 32, locks the bolt in the "stop" position, the key being unwithdrawn. The rod 23, biased by a compression spring 16, ensures the connection between the key 6 and this lug 13. Thus, the bolt can only be engaged for locking the steering column after the key 6 has been withdrawn.

When unlocking, rotation of the key 6 shifts the ramp 10 through the crank-pin 8 and the link 9, which ramp still bears against the roller 11 so that it withdraws and disengages the bolt 15 in compressing the spring 14.

In this movement, the end of the rod 23 slides along the inclined part of the lug 13 and compresses the spring 22. Thus the bolt 15, in withdrawing, passes through the obstacle that the lug 13 could constitute.

After the rod 23 has passed beyond the lug 13, this rod prevents any locking movement of the bolt 15.

The switch 12 associated with the anti-theft device is of the linear type. The cam 10 carries at its end an insulating plate 12 and a contact strip 20. The cam 10 shifts this strip 20 along fixed studs 21 against which it is urged by elastically yieldable means (not shown). The cam 10 thus performs the interconnecting function pertaining to a switch associated with an antitheft device. It will be clear that, without departing from the scope of the invention, the general plane of the device with respect to the axis of the bolt may be oriented to be perpendicular or inclined with respect to that of the Figure so as to place the key to the left or to the right of the steering column.

As the lock element is completely disassociated from the bolt element, it is possible, by modifying the length of the link 9, to place these two elements at a distance from each other to satisfy the requirements of the conditions of use or the directions of the constructor.

It is, of course, to be appreciated that it is possible in, for example, an embodiment similar to that of FIG. 2 that the switch may be operated directly from the lock while the bolt is operated by means of a connection including gears.

What is claimed is:

1. An anti-theft device for a vehicle comprising a structure including a bolt movable in a rectilinear path for locking engagement with an element of the vehicle necessary for the operation of that vehicle, an electrical switch means including a switch member rotatable about a first axis and a cylindrical lock including an operating element rotatable about a second axis different than said first axis, each of said first and second axes being different than said path, a connection between said rotatable element and said bolt to move said bolt in a locking and unlocking direction along said path as said lock is operated and a connection between said rotatable element and said rotary switch means to operate said switch means upon operation of said lock, said connection between said switch means and said lock including gears, said switch and said bolt overlapping each other along said second axis whereby the overall length of said structure, measured along said second axis is lesser than that of an existing structure in which said bolt and said switch are not so overlapped.

2. A device as claimed in claim 1 wherein said first axis is parallel to and offset from said second axis.

3. A device as claimed in claim 1 wherein said first axis is perpendicular to said second axis.

4. A device as claimed in claim 2 wherein said gears are cylindrical.

5. A device as claimed in claim 3 wherein said gears are bevel gears.

6. A device as claimed in claim 5 wherein said first axis is perpendicular to said locking and unlocking direction.

7. A device as claimed in claim 5 wherein said first axis is perpendicular to said locking and unlocking direction.

8. An anti-theft device for a vehicle as claimed in claim 1, wherein two of said axes and said path are parallel to one another and normal to the remaining one of said axes and said path.

* * * * *